United States Patent [19]
Stoddard

[11] Patent Number: 4,574,917
[45] Date of Patent: Mar. 11, 1986

[54] THREE-PIECE KNOCK-DOWN SAWHORSE

[76] Inventor: Evan D. Stoddard, 4225 Polk Ave., San Diego, Calif. 92105

[21] Appl. No.: 714,201

[22] Filed: Mar. 21, 1985

[51] Int. Cl.⁴ .......... F16M 11/00
[52] U.S. Cl. .......... 182/151; 182/181; 182/224; 248/165; 108/56.1
[58] Field of Search .......... 182/151, 181, 224; 297/440, 442; 248/165; 108/56.1

[56] References Cited

U.S. PATENT DOCUMENTS

| | | | |
|---|---|---|---|
| D. 245,105 | 7/1977 | Rader | 25/67 |
| 1,832,801 | 11/1931 | Wright | 248/165 |
| 2,279,864 | 4/1942 | Eide | 248/165 |
| 3,035,660 | 5/1962 | Leon | 182/181 |
| 3,603,656 | 9/1971 | Ferman | 297/442 |
| 4,105,091 | 8/1978 | Mahan | 182/151 |
| 4,140,065 | 2/1979 | Chacon | 297/440 |
| 4,182,432 | 1/1980 | Cossitt | 182/151 |
| 4,433,753 | 2/1984 | Watson | 182/151 |

*Primary Examiner*—Reinaldo P. Machado
*Attorney, Agent, or Firm*—Charmasson & Holz

[57] ABSTRACT

A sawhorse comprising three interlocking plywood panels, a pair of which function as legs at either end of the remaining panel, which functions as the back of the sawhorse. Each end of the back is fitted with a pair of vertically-spaced tabs which define downward-facing notches. Those notches fit into a mating upward-facing notch and a mating slit in the leg panels. An arcuate edge on each end of the back between the pair of vertically-spaced notches requires that the leg panels be stressed in order to align the notches of the back with the notch and slit of the leg support panel. Without the use of any special securing hardware, the stressed assembly prevents the sawhorse from collapsing if it is lifted by the back or mechanically jolted.

2 Claims, 3 Drawing Figures

THREE-PIECE KNOCK-DOWN SAWHORSE

FIELD OF THE INVENTION

The present invention relates to support structures, and more specifically, to collapsible sawhorses.

BACKGROUND OF THE INVENTION

It is amazing that in the past thirty years, well in excess of one hundred patents have been granted for variations on the sawhorse. Many of the patents have been focused on methods for folding or collapsing the rather unweildly device, while others have focused on the addition of features which enhance the utility of the device.

Most patents directed toward making the sawhorse more compact for storage have taken the folding leg approach. However, in U.S. Pat. No. 3,035,660 issued to Louis E. Leon, the inventor teaches the construction of a four-piece sawhorse which requires no hardware for assembly. The sawhorse comprises a pair of identical, spaced apart, essentially equilaterally triangular, inwardly tilting legs connected at their apices by a back beam and at corresponding points on their medians by a spreader beam. The beams connect to the legs by means of interlocking notches and slits. U.S. Pat. No. 245,105, issued to Richard J. Rader, shows another four-piece sawhorse, which comprises two parallel back beams inserted near each ends through a pair of vertical notches in a leg panel. Although it is not clear from the patent how the four pieces are connected or whether the unit may be disassembled, the design obviously provides less rigidity and less strength than does the Leon design It is possible to construct an improved sawhorse that has even fewer parts, greater strength and more rigidity than the sawhorses taught by either Leon or Rader.

SUMMARY OF THE INVENTION

The primary of the present invention is to provide an inexpensively-manufactured knock-down sawhorse comprised of an absolute minimum number of components, which is extremely strong and rigid in relation to its weight, which may be easily assembled and disassembled without the use of tools or securing hardware, and which may be compactly stored or packaged in its disassembled state.

This has been accomplished by constructing a sawhorse from three interlocking plywood panels. Of the three panels, one is distinct and functions as the back of the sawhorse. The pair of remaining panels function as legs at either end of the back. Each end of the back is fitted with a pair of vertically-spaced downward facing notches which fit into an mating upward-facing notch and a mating slit in the leg support panels. A slight radius on each end of the back between the pair of vertically-spaced notches requires that the leg support panels be stressed in order to align the notches of the back with the notch and slit of the leg support panel. Without the use of any special securing hardware, the stressed assembly prevents the sawhorse from collapsing if it is lifted by the back or mechanically jolted.

DESCRIPTION OF THE PREFERRED EMBODIMENT OF THE INVENTION

Figure 1:
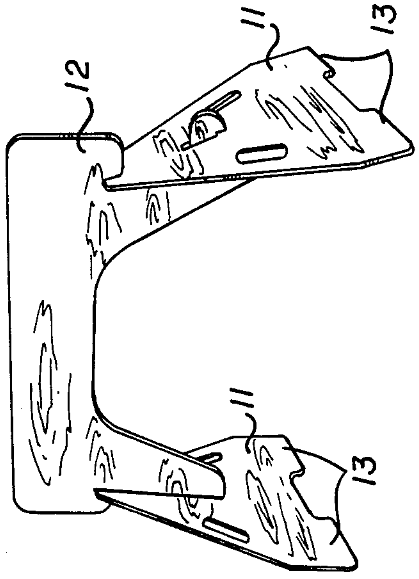
FIG. 1 is a perspective view of the assembled sawhorse.

Referring now to FIG. 1, the sawhorse is comprised of a pair of identical, inwardly-tilted, essentially equilaterally triangular leg panels 11, interlockingly attached to opposite ends of back panel 12. In the assembled configuration, the lower edges 13 of triangular leg panels 11 are parallel.

Figure 2:
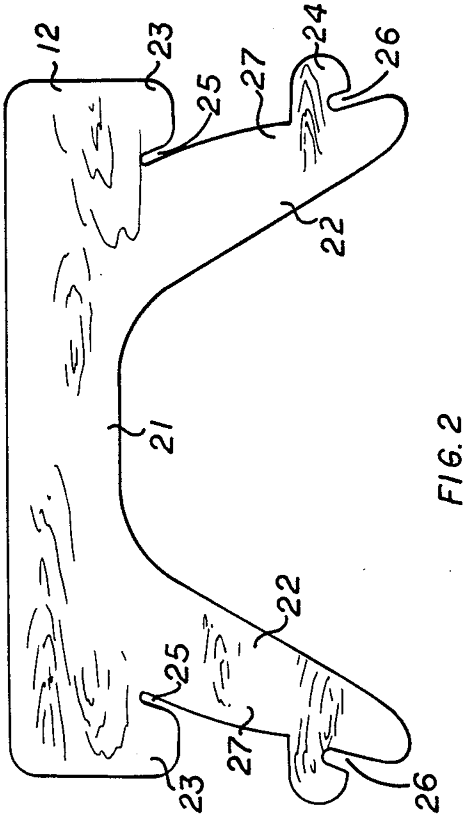
FIG. 2 is an elevational view of one side of the back panel.

Referring now to FIG. 2, back panel 12 is constructed from a sheet of 1.5875 cm ($\frac{5}{8}$ in.) thick plywood. Back panel 12 has a longitudinal section 21 from which leg anchoring projections 22 downwardly extend. At each end of back panel 13, tabs 23 and 24 define a pair of vertically-spaced downward-facing notches 25 and 26, respectively. The widths of both notches are identical, being wider than the thickness of leg panels 11 by an amount just sufficient to allow a slip fit of the leg panel into notches 25 and 26. Outer edges 27 of anchoring projections 22 have a slight outward curvature.

Figure 3:
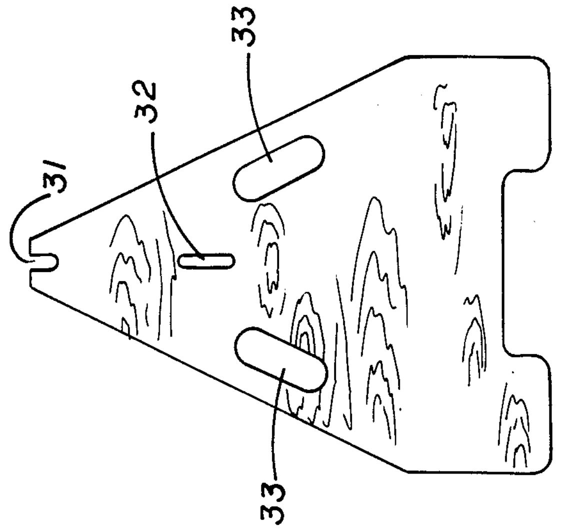
FIG. 3 is an elevational view of one side of one of the two identical leg panels.

Referring now to FIG. 3, leg panels 11, also made of 1.5875 cm-thich plywood, have an upward-facing notch 31 at their apices and a vertical slit 32 located symmetrically about the axis of symetry of said leg panel. The distance between the bottom of notch 31 and the bottom of slit 32 corresponds to the distance between the top of notch 25 and the top of notch 26 at each end of back panel 21. Oblong holes 33 serve as handles.

The sawhorse is assembled by engaging the back-panel notches 25 and 26 with leg-panel notch 31 and leg panel slit 32, respectively. Because of the slight outward curvature of edges 27, the leg panels must be stressed. This stressing of leg panels 11 creates a structurally-tight sawhorse held together by friction forces between the interlocking parts; it may be lifted or severely jolted without fear of it collapsing.

While the preferred embodiment of the invention has been described, other embodiments may be devised and modifications may be made thereto without departing from the spirit of the invention and the scope of the appended claims. For example, panels made of fiber-reinforced plastic material may be substituted for the plywood panels.

What is claimed is:

1. A knock-down sawhorse comprising:

(A) a back panel having identical end sections; and (B) a pair of identical, bilaterally symmetrical leg panels;

(1) each lateral edge of said back panel having first and second vertically-spaced tabs, which respectively define first and second downward-facing notches;

(2) each leg panel having a centrally-located upward-facing notch in its upper edge and a vertically-oriented slit vertically-spaced directly below said upward-facing notch;

(3) the distance between the bottom of said centrally-located notch and the bottom of said slit corresponding to the distance between the top of said first downward-facing notch and said second downward-facing notch at either edge of said back panel;

(4) said first and second downward-facing notches at one lateral edge of said back panel respectively interlocking with the upward-facing notch and slit of one of said leg panels when said sawhorse is assembled;

(5) the lower edges of said leg panels being parallel when said sawhorse is assembled; and (6) wherein a section of each lateral edge between the first and second downward-facing notches at each end of said back panel is outwardly curved and the leg panels are stressed when said sawhorse is assembled.

2. The sawhorse of claim 1 wherein said back panel and said leg panels are cut from sheets of plywood.

* * * * *